C. A. M. WEBER.
METHOD OF CONSTRUCTING SECONDARY MEMBERS OF INDUCTION MOTORS.
APPLICATION FILED SEPT. 8, 1920.
1,435,357.
Patented Nov. 14, 1922.
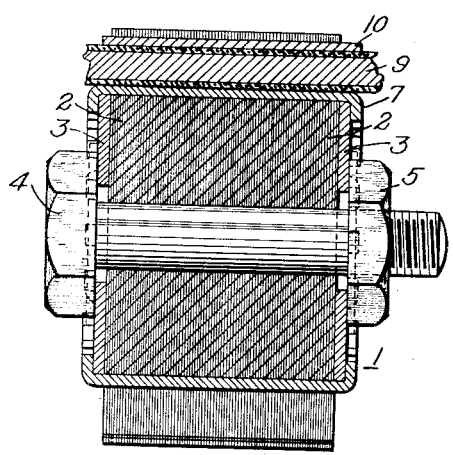
Fig. 2.
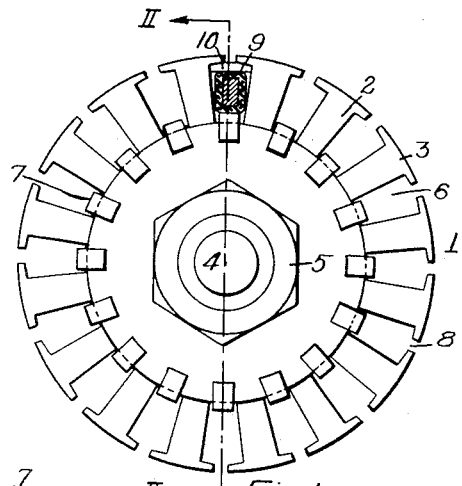
Fig. 1.
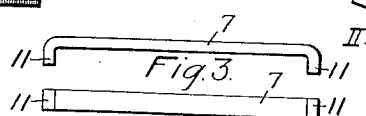
Fig. 3.
Fig. 4.
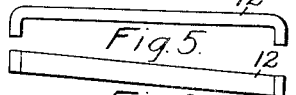
Fig. 5.
Fig. 6.
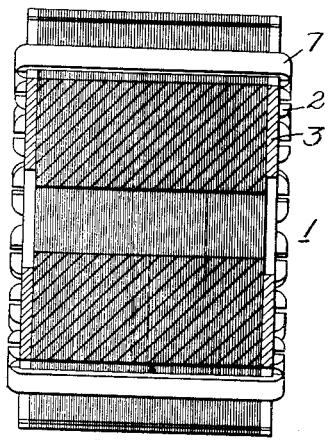
Fig. 8.
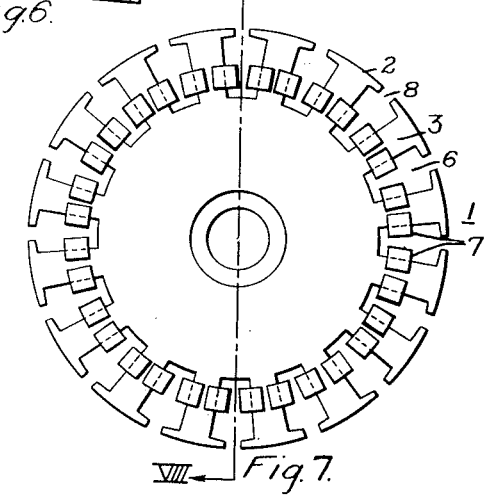
Fig. 7.
WITNESSES:
J. A. Helsel
H. C. Lowe
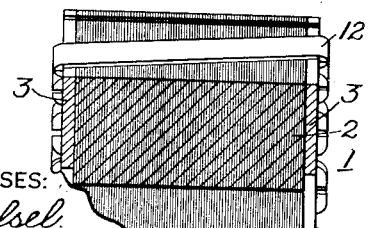
Fig. 10.
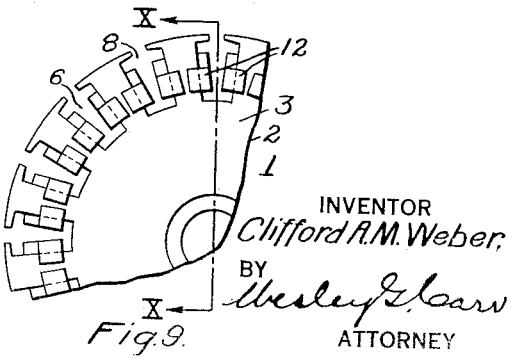
Fig. 9.
INVENTOR
Clifford A. M. Weber
BY
Wesley G. Carr
ATTORNEY Patented Nov. 14, 1922.

1,435,357

UNITED STATES PATENT OFFICE.

CLIFFORD A. M. WEBER, OF SWISSVALE, PENNSYLVANIA, ASSIGNOR TO WESTINGHOUSE ELECTRIC & MANUFACTURING COMPANY, A CORPORATION OF PENNSYLVANIA.

METHOD OF CONSTRUCTING SECONDARY MEMBERS OF INDUCTION MOTORS.

Application filed September 8, 1920. Serial No. 408,862.

*To all whom it may concern:*

Be it known that I, CLIFFORD A. M. WEBER, a citizen of the United States, and a resident of Swissvale, in the county of Allegheny and State of Pennsylvania, have invented a new and useful Improvement in Methods of Constructing Secondary Members of Induction Motors, of which the following is a specification.

My invention relates to the construction of secondary members for induction motors and has particular relation to the method of constructing windings for secondary members of the squirrel-cage type which have a plurality of core punchings in which are positioned induction bars.

The object of my invention is to provide a process which shall decrease the number of operations and the expense incurred in manufacturing such secondary members.

Heretofore, it was customary to insert conductors in the slots of the core member and to bend or press the ends of the conductors against the outer faces of the core. The driving of these conductors through slots of substantially the same size as the diameter of the conductors required considerable skill and time. Occasionally, the conductor became bent while being driven into the slot and it was necessary for the workman to straighten it or to remove it with pliers. In some cases, conductors, individually having one end bent or provided with a head, were inserted in the slots and the other ends were bent after the conductors were in position. The positioning of the conductors in the slots formed a relatively large part of the cost of manufacturing the secondary members.

By my invention, I provide a method of mounting inductor bars in the secondary members of dynamo-electric machines which requires no driving of the bars or bending their ends after they are in position.

Briefly speaking, my invention consists in stacking a plurality of core punchings that are provided with slots relatively near their peripheries, applying pressure thereto, inserting inductor bars of substantially U shape in the slots and having the bent ends of the bars fit against the outer surfaces of the resistance rings, which are in engagement with the end core punchings, and then removing the pressure upon the core punchings. The inductor bars clamp the core punchings together when the pressure is removed.

For a better understanding of my invention reference may now be had to the accompanying drawing, Fig. 1 of which is an end view, in elevation, of a plurality of core punchings and resistance rings or end plates mounted upon a holding device and showing a plurality of slots relatively near the peripheries thereof, in which the inductor bars and a winding are positioned. For the sake of clearness, the winding is shown in only one of the slots.

Fig. 2 is a sectional view of the core punchings, the end plates, the inductor bars and the portion of the winding mounted upon the device shown in Fig. 1, the section being taken along the line II—II thereof.

Figs. 3 and 4 are detail views of an inductor bar shown in Figs. 1 and 2.

Figs. 5 and 6 are detail views of a skewed inductor bar for a rotor.

Fig. 7 is a view, in end elevation of a secondary member or rotor provided with slots in each of which two inductor bars are positioned.

Fig. 8 is a sectional view of the secondary member shown in Fig. 7, the section being taken along the line VIII—VIII of Fig. 7.

Figs. 9 and 10 are views, in end elevation, and section, respectively, of a portion of a secondary member or rotor comprising a plurality of slotted core punchings and inductor bars mounted in skewed relation thereon.

In Figs. 1 and 2, I show a secondary member or rotor 1 comprising a plurality of core punchings 2 and end plates 3 mounted upon a holding device or bolt 4 provided with a nut 5 for regulating the pressure upon the core punchings 2 and end plates 3. The core punchings 2 and the end plates 3 are provided with slots 6 relatively adjacent to their peripheries in which are positioned the inductor bars 7 which are also known as conductor bars. Each of the slots 6 may be provided with an opening 8 extending to the outer circumference of the core punchings 2 and the end plates 3, as shown in the accompanying drawing, or the opening 8 may be eliminated and the slot 6 closed. A commutated winding 9 is maintained within the slots 6 by means of wedges 10. For the sake of clearness, the commutated winding 9 and the wedges 10 are shown only in one slot.

Each inductor bar 7 is provided with bent end portions 11 which give the bar a U shape in appearance. (See Figs. 3 and 4.) It is apparent that the bendings of the ends 11 of the bars 7 may be performed by machinery, and, if the bars are employed in skewed slots, they must be so bent as to have a helical shape.

The inductor bars 7 are positioned in the slots 6 by first so stacking the core punchings 2 and resistance rings or end plates 3 upon the holding members 4 that the slots 6 thereof are in proper alignment and applying pressure upon them. By tightening the nut 5, the inductor bars 7 are so positioned in the slots 6 that their ends 11 over-lap the end plates 3 and are in engagement therewith. When the pressure upon the punchings 2 and end plates 3 is released, they press against the ends 11 of the bars 7 which maintain them in fixed relation to each other.

The winding 9 and wedges 10 may be inserted in the slots 6, when the core punchings 2 and end plates 3 are mounted upon the holding member 4 or after they have been removed.

In Figs. 5 and 6, the inductor bars 12 are shown as so shaped that they may be placed in slots 6 in skewed relation to the end plates.

In Figs. 7 and 8, two inductor bars 7 are shown positioned against the sides of the slots 6 instead of a single bar positioned at the base of the slot as shown in Figs. 1 and 2.

It is apparent that the bars 7 may be inserted in one end of the slot 6 parallel to the axis of the rotor or be inserted radially through the opening 8 into the slot 6. The bars 7 may be made of greater width and thickness, in comparison with the size of the slots 6, if it is considered desirable.

In Figs. 9 and 10, two inductor bars 12 are shown in each of the slots 6 in skewed relation to the end plates 3. It is apparent that a single bar 12 may be positioned in the slot 6 in the same manner. It may be here stated that it is the usual custom to solder the ends of the bars to the resistance rings or end plates after the bars are in position, to insure good electrical contact therewith.

It will be observed by those skilled in the art that, by my invention, I have provided a method of constructing secondary members for induction motors and positioning inductor bars therein that is relatively simple and more economical than any heretofore used and that apparatus constructed in accordance therewith is relatively strong and durable.

While I have shown my invention in its preferred form, it will be observed by those skilled in the art that it is not so limited but is susceptible to various minor alterations and changes without departing from the spirit thereof. I desire, therefore, that only such limitations shall be placed thereupon as are imposed by the prior art or as are specifically set forth in the appended claims.

I claim as my invention:

1. The method of constructing a secondary member for an induction motor which comprises stacking a plurality of core laminations and end plates in predetermined relation with respect to each other, applying an initial pressure thereto to compress the stacked laminations between the end plates, and mounting previously formed inductor bars of substantially U shape thereon to maintain said laminations and end plates in position under compression when the assembling pressure is removed.

2. The method of constructing a secondary member for an induction motor which comprises, stacking a plurality of core laminations and end plates in predetermined relation with respect to each other, applying an initial pressure thereto to compress the stacked laminations between the end plates, and mounting inductor bars thereon having the extremities thereof previously bent in the same direction to maintain said laminations and end plates in position under compression when the assembling pressure is removed.

3. The method of constructing a secondary member for an induction motor which comprises, stacking a plurality of core laminations and end plates in predetermined relation with respect to each other, applying an initial pressure thereto to compress the stacked laminations between the end plates, and mounting inductor bars thereon having previously formed bent extremities to maintain said laminations and end plates in position under compression when the assembling pressure is removed.

In testimony whereof, I have hereunto subscribed my name this 1st day of September, 1920.

CLIFFORD A. M. WEBER.